CONTINUOUS WAVE NAVIGATION SYSTEM

Original Filed Oct. 28, 1947 6 Sheets-Sheet 1

INVENTOR.
WINSLOW PALMER
BY Paul B. Hunter
ATTORNEY

CONTINUOUS WAVE NAVIGATION SYSTEM

Original Filed Oct. 28, 1947 6 Sheets-Sheet 2

INVENTOR.
WINSLOW PALMER
BY
Paul B. Hunter
ATTORNEY

CONTINUOUS WAVE NAVIGATION SYSTEM
Original Filed Oct. 28, 1947 6 Sheets-Sheet 3
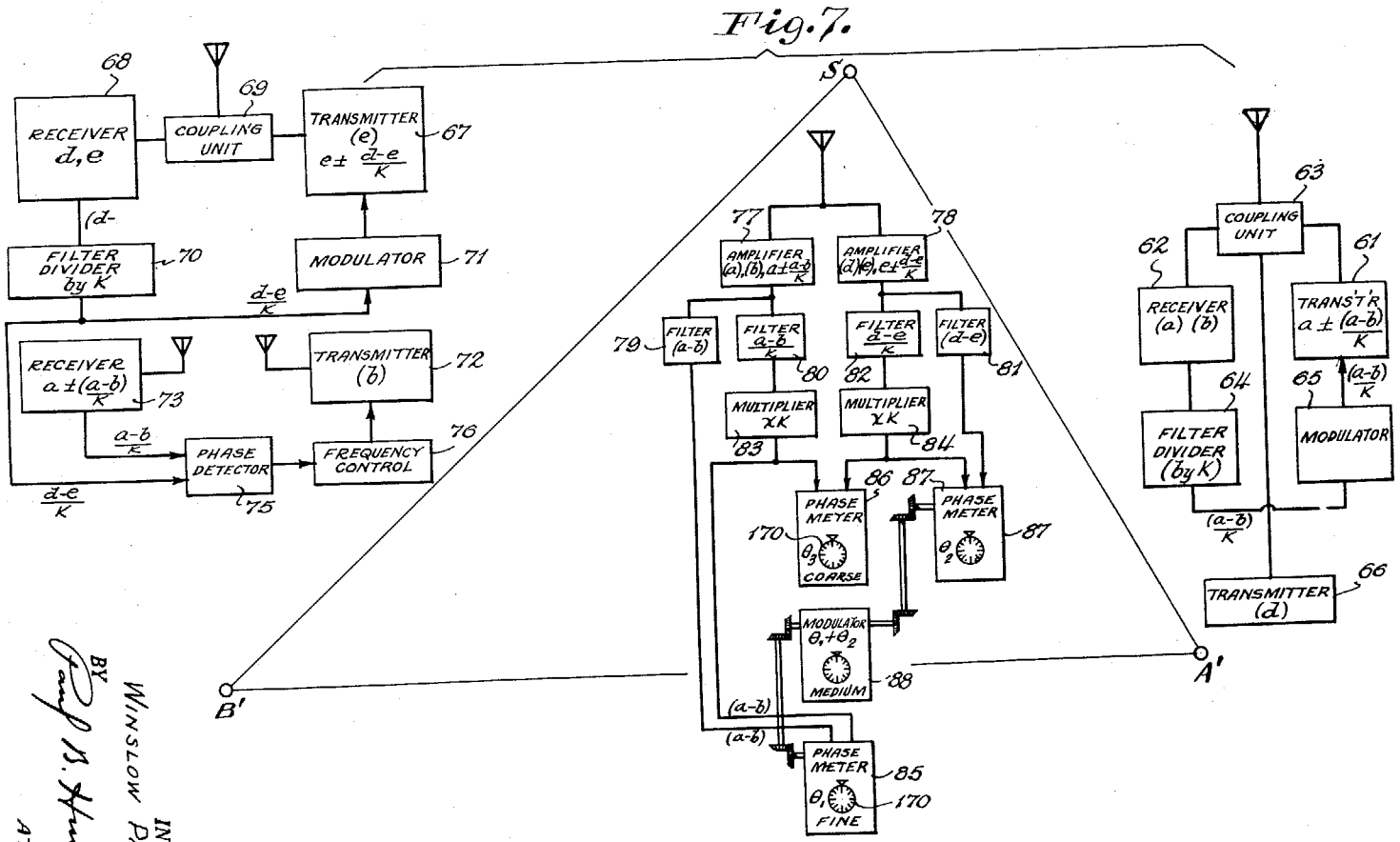
INVENTOR.
WINSLOW PALMER
BY Paul B. Hunter,
ATTORNEY CONTINUOUS WAVE NAVIGATION SYSTEM
Original Filed Oct. 28, 1947 6 Sheets-Sheet 4
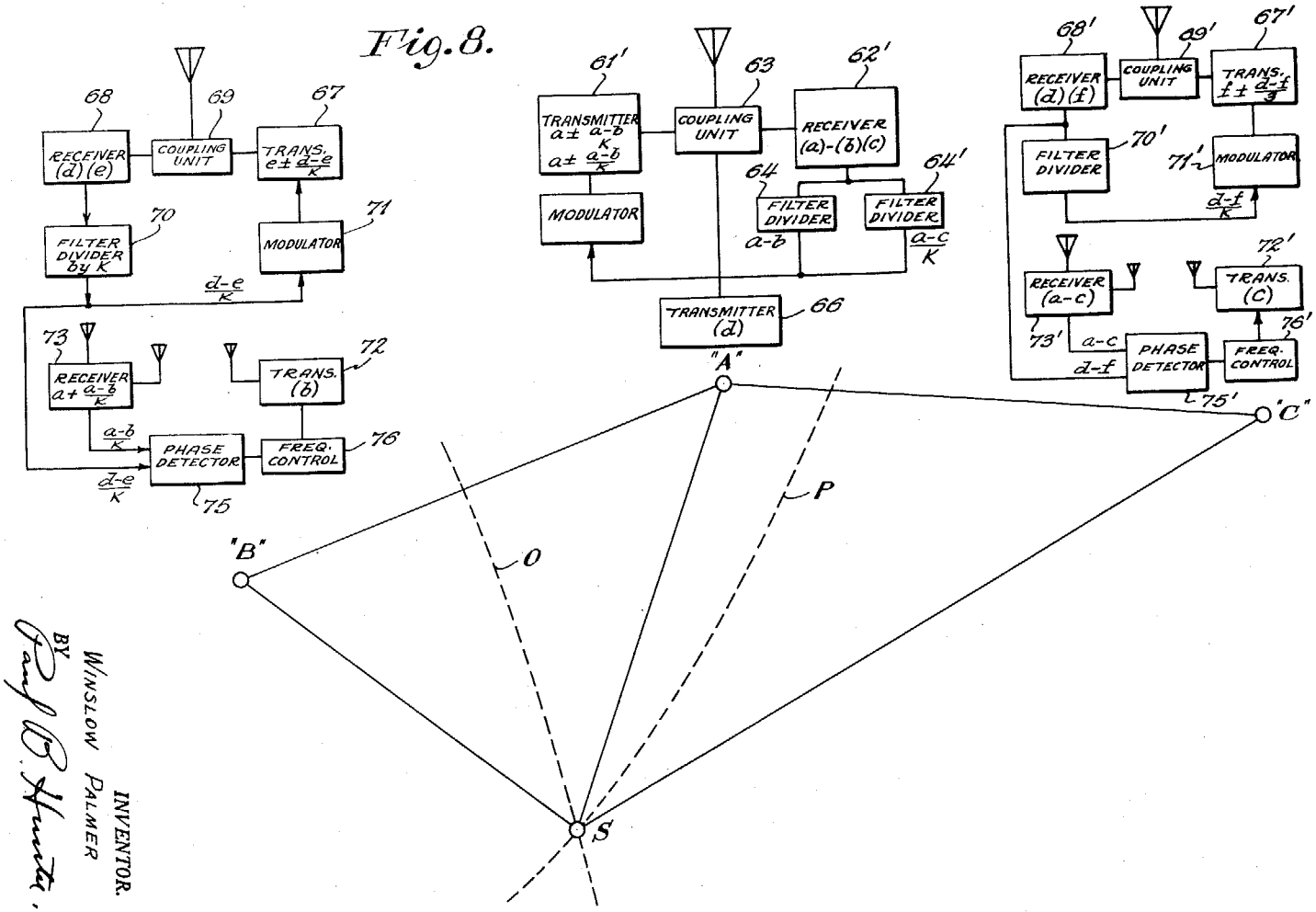
INVENTOR.
WINSLOW PALMER
BY Paul B. Hunter.
ATTORNEY

CONTINUOUS WAVE NAVIGATION SYSTEM

Original Filed Oct. 28, 1947 6 Sheets-Sheet 5

INVENTOR.
WINSLOW PALMER
BY Paul B. Hunter.
ATTORNEY

CONTINUOUS WAVE NAVIGATION SYSTEM

Original Filed Oct. 28, 1947 6 Sheets-Sheet 6

INVENTOR.
WINSLOW PALMER
BY Paul B. Hunter.
ATTORNEY

United States Patent Office

Re. 24,891
Reissued Oct. 25, 1960

24,891

CONTINUOUS WAVE NAVIGATION SYSTEM

Winslow Palmer, West Hempstead, N.Y., assignor, by mesne assignments, to Seismograph Service Corporation, Tulsa, Okla., a corporation of Delaware Original No. 2,611,127, dated Sept. 16, 1952, Ser. No. 782,529, Oct. 28, 1947. Application for reissue July 9, 1953, Ser. No. 367,125

41 Claims. (Cl. 343—105)

Matter enclosed in heavy brackets [ ] appears in the original patent but forms no part of this reissue specification; matter printed in italics indicates the additions made by reissue.

This invention relates to continuous wave radio position determining systems and more particularly to the elimination of cyclic ambiguity in such systems.

Radio navigation systems of the hyperbolic type, such as loran are well-known. In these systems, a master and a slave station transmit pulses having a definite time relationship, and the difference of time of reception of the pulses is measured at the receiving location thereby establishing a hyperbolic locus of receiving positions relative to the location of the transmitter stations. Another combination of transmitting stations is utilized to provide an intersecting hyperbolic locus of positions and thereby a navigational fix.

Continuous wave hyperbolic radio navigation systems are also well-known. In this type of system, the continuous wave signals have a definite phase relationship at the transmitting locations and the difference in phase at the receiving location is utilized to determine a hyperbolic locus of positions relative to the transmitting locations.

A serious difficulty encountered with continuous wave systems is cyclic ambiguity. It is relatively easy to measure a difference in phase of less than one cycle but it is difficult to keep track of full cycle of phase difference. In practical operation, it is quite necessary to resolve this cyclic ambiguity. For example, at 2,000 kilocycles the wavelength is 150 meters, a distance which is rapidly traversed by a fast moving aircraft.

Several methods have been proposed for resolving the cyclic ambiguity and they are as follows:

(1) Start from a known point and keep a continuous record of the change of position.

This method is practical and useful only for such purposes as surveying or reconnaissance where a minimum of receiving equipment is advantageous and a continuous record is kept. It is also useful for low velocity travel such as marine navigation. In this method the calibrated instrument is set at the known starting position and is operated continuously and counts full cycle changes of phase. It is not suitable where the operation is not continuous, and it may not be used for intermittent operation or where there is a probability of interruption of the use of the equipment.

(2) Limit the base lines between the transmitted locations to a half wavelength.

This makes the total phase shift on going from one station to another to be but one full cycle so that the system is substantially unambiguous. However, the short base line seriously reduces the accuracy and area of coverage of the system.

In this invention, the ambiguity is resolved by utilizing two channels slightly separated in frequency. The difference frequency between the channels may be effectively utilized as a second system whose wavelength is long enough so that its phase shift is substantially unambiguous. This longer wavelength system is used as a "medium" reading to resolve ambiguity in the "fine" high frequency readings. A further extension of the non-ambiguous range is obtained by using synchronized low frequency modulation signals on the above-mentioned pair of carrier channels in a manner that will be explained hereafter. These modulation frequencies may be utilized as a third "coarse" system having a wavelength long enough to resolve ambiguities in the "medium" system.

Accordingly, a principal object of the invention is to provide a continuous wave radio navigation system without cyclic ambiguity.

Another object of the invention is to provide a continuous wave radio hyperbolic navigation system without cyclic ambiguity, which may be operated intermittently.

Another object of the invention is to provide a continuous wave, radio navigation system utilizing phase comparison of radio frequencies.

The invention also relates to the novel features or principles of the instrumentalities described herein, whether or not such are used for the stated objects, or in the stated fields or combinations, wherein Figs. 1 and 2 are diagrams illustrative of the principles of operation of the invention;

Fig. 7 is a schematic block diagram illustrative of *a* continuous [waves] *wave* hyperbolic navigation system, without cyclic ambiguity;

Figs. 8 and 8A are schematic block diagrams of *a* continuous [waves] *wave* hyperbolic navigation system, without cyclic ambiguity;

The operation of the system of this invention may best be understood by considering three basic principles, as follows:

PRINCIPLE I

Given a transmitter at one location, radiating a wave and a receiver responding to the wave at another location, the phase of the wave at the receiver is delayed relative to the phase of the wave at the transmitter by an angle equal to the distance from the transmitter to the receiver in wavelenghs.

This may be proved as follows:

The wave at the transmitter as a function of time is given by $$e_a = e \sin 2\pi ft \qquad (1)$$

the wave at the receiver is then $$e_s = e' \sin 2\pi f\,(t - R/v) \qquad (2)$$

where R is the distance from the transmitter to the receiver and v is the propagation velocity of the waves.

The wavelength ($\lambda$) is given by $$\lambda = v/f \qquad (3)$$

therefore $$e_s = e' \sin (2\pi ft - 2\pi R/\lambda) \qquad (4)$$

Hence, the wave at the receiver lags the wave at the transmitter by an angle equal to $2\pi R/\lambda$ radians.

PRINCIPLE II

When two waves are mixed and the heterodyne beat is extracted, if either of the component waves is shifted in phase through a certain angle, the beat frequency will shift in phase through the same angle.

Figure 1:
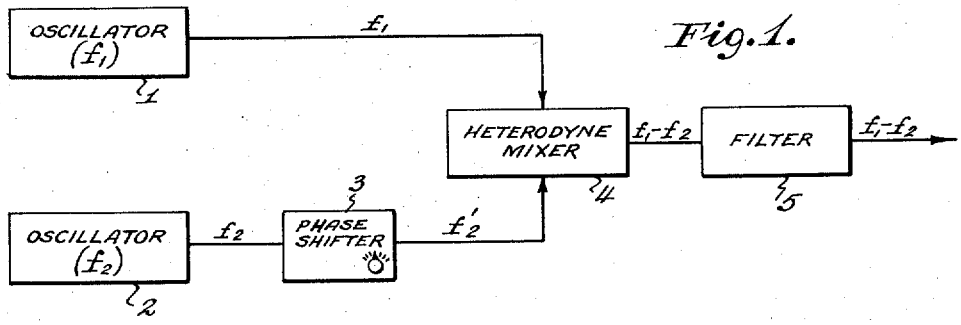
Figure 2:
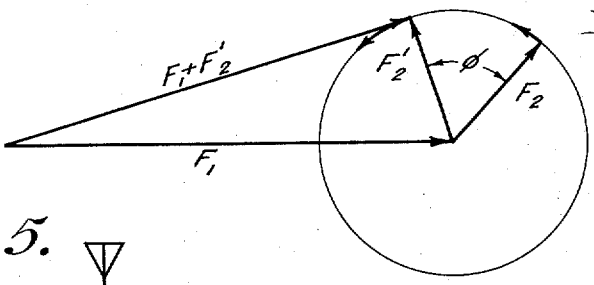

This may be proved as follows:

Consider a system as shown in Fig. 1. It consists of two oscillators, 1 and 2, generating different frequencies ($f_1$) and ($f_2$). The wave from oscillator 1 may be represented by a vector $F_1$ as in Fig. 2. The wave from oscillator 2 may be considered to have the same frequency as the wave from oscillator 1 with an additional continuous change in phase at a rate equal to the difference in frequency, or angular rate of $2\pi(f_1-f_2)$ radians per second. The wave may be represented by the vector $F_2$, which rotates continuously relative to vector $F_1$, as indicated by the arrow.

The angular position of vector $F_2$ in addition to the steady rotation due to the frequency difference, may be shifted an additional amount $\phi$ by phase shifter 3 as indicated by $F'_2$.

The sum of the two vectors $F_1$ and $F'_2$ is a vector whose magnitude may be found by the law of cosines:

$$F_1+F'_2=\sqrt{f_1^2+f'^2_2+2\cdot F_1\cdot F'_2\cdot\cos[2\pi(f_1-f_2)t+\phi]} \quad (5)$$

The heterodyne mixer 4 and the filter 5 extract the fundamental component $$\cos[2\pi(f_1-f_2)t+\phi]$$

of the variations of the magnitude of the sum vector $F_1+F'_2$ due to the rotation and shift in phase of $f'_2$ relative to $f_1$. Therefore, the phase of the heterodyne beat varies by the angle $\phi$ exactly as the phase of $F'_2$ varies by the angle $\phi$ relative to $F'_2$ and $F_1$.

PRINCIPLE III

When a modulated wave is transmitted, the phase of the modulation frequency wave, when demodulated at the receiver, lags the modulation frequency wave at the transmitter, by an angle equal to the number of wavelengths of the modulation frequency between the transmitter and the receiver.

This may be shown as follows:

A modulated wave may be represented by the equation $$e_s=e_o \sin 2\pi f_c t(1+m \sin 2\pi f_m t) \quad (6)$$

where $f_c$ is the carrier radio frequency and
$f_m$ is the modulation frequency At the receiver the waves will be retarded by the time of travel (R/v) between transmitter and receiver where R=the distance and v=the velocity of propagation.

Hence, at the receiver $$e_r=E_r[1+m \sin 2\pi f_m(t-R/v)] \sin \pi 2f_c(t-R/v) \quad (7)$$

A linear detector is not affected by the phase of the carrier, hence, the demodulated wave $e_m$ will have the form $$e_m=mE_r \sin[2\pi f_m t-2\pi R/\lambda_m] \quad (8)$$

since $$\lambda_m=v/f_m \quad (9)$$

Hence, the phase of the modulation frequency at the receiver will be retarded by $2\pi R/\lambda$ radians relative to the phase of the modulation at the transmitter.

Figure 3:
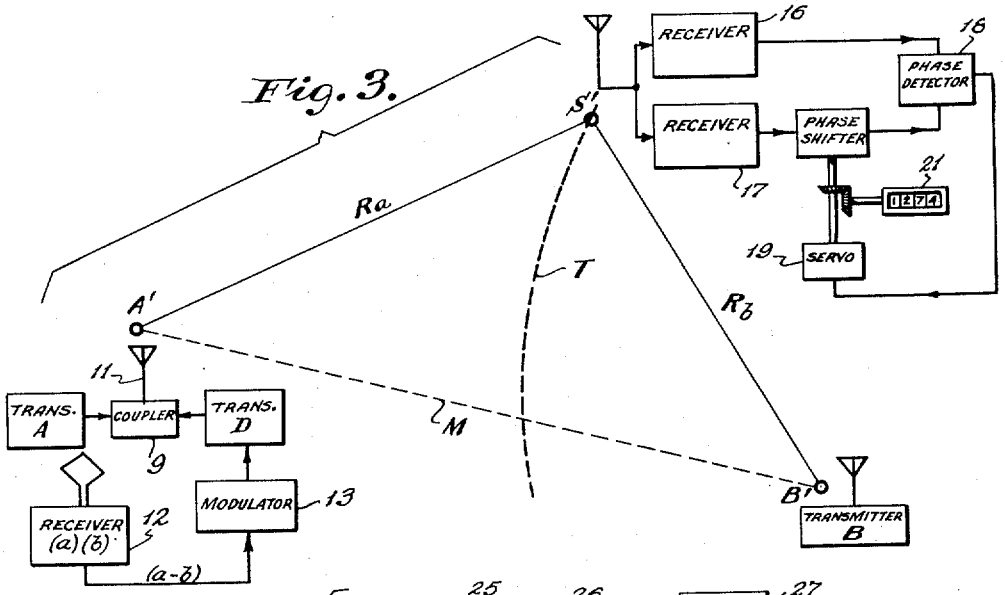
Fig. 3 is a schematic diagram illustrative of a continuous wave hyperbolic navigation system.

Referring to Fig. 3 there is shown an embodiment of a hyperbolic coordinate system, as taught by the present invention. Two C.W. (continuous wave) transmitting stations placed at suitable locations in relation to the area they are to serve, define lines of position as contours of constant phase difference between the beat frequency waves directly obtained by mixing the signals from the two stations and a reference beat frequency transmitted from one of the stations. This will be shown as follows: Transmitter A at location A′ sends out a radio frequency wave (a), and a transmitter B at location B′ sends out a second radio frequency wave (b), differing in frequency from (a) by only a fraction of a percent.

At station A′ there is a receiver 12 that receives both frequency (a) and frequency (b), beats them together, extracts the beat frequency (a—b) and modulates a third transmitter D, with the beat frequency, by means of modulator 13. Transmitters A and D are coupled together and to antenna 11 by means of coupler 9.

The receiver apparatus at S′, the position to be determined, contains two radio frequency receivers. Receiver 16 receives frequencies (a) and (b), beats them together and extracts the beat frequency wave. Receiver 17 receives the carrier frequency (d) and its modulation and extracts the modulation frequency. A phase detector 18 then measures the phase angle between the directly derived beat frequency, and the reference modulation beat frequency. The phase angle may be automatically indicated as follows: the phase detector 18 generates a voltage proportional to the cosine of the phase difference, and this voltage is fed to servo 19 which turns the phase shifter 20 in such a manner as to reduce the phase difference to 90°. Calibrated indicator 21, which may be a mechanical counter device, is geared to the shaft of servo 19 and thereby indicates continuously and automatically the phase difference.

The phase angle difference is a function of the position of the receiver, and depends upon the difference of the distances from the receiver at S, to the transmitters at A′ and B′, respectively. This can be shown as follows:

The waves received at S′ from transmitters A and B are respectively $e_a$ and $e_b$ where $$e_a=e_a \sin 2\pi a(t-R_a/C) \quad (10)$$

and $$e_b=e_b \sin 2\pi b(t-R_b/\cancel{[c]}C) \quad (11)$$

where $R_a$ and $R_b$ are the respective distances to A′ and B′ and C is the propagation constant for radiant energy.

The beat frequency from the receiver 16 is obtained by beating these two waves together and is $e_l$ where $$e_l=E_l \cos[2\pi a(t-R_a/C)-2\pi b(t-R_b/C)] \quad (12)$$

The wave from transmitter B at transmitter A is given by $$e_b'=E_b' \sin 2\pi b(t-M/C) \quad (13)$$

and the beat frequency that is modulated upon transmitter D is $$e_m'=E_m' \cos[2\pi at-2\pi b(t-M/C)] \quad (14)$$

The modulated wave at the receiver 17 is delayed by the time of transit from transmitter D, and is given by $$e_m'=E_m' \cos[2\pi a(t-R_a/C)-2\pi b(t-R_a/C-M/C)] \quad (15)$$

The phase angle $\theta$ is measured at the phase detector 18 between the modulation frequency and the beat frequency and is obtained by taking the difference of the arguments in Equations 12 and 15.

$$\theta=2\pi a(t-R_a/C)-2\pi b(t-R_a/C-M/C) -[2\pi a(t-R_a/C)-2\pi b(t-R_b/C)] \quad (16)$$

This reduces to $$\cancel{[\theta=2\pi b/C[M+(R_a-R_b)]]}$$
$$\theta=(2\pi b/C)[M+(R_a-R_b)] \quad (17)$$

Equation 17 shows that the phase angle $\theta$ between the beat frequency and modulation frequency at the receiver depends upon the difference of the distances to the two transmitters, plus a constant that is determined by the distance between the transmitters. It should be noted that the phase angle is independent of the frequencies (a) and [(d)] (*b*), and of the beat frequency. The measurement is made solely in terms of frequency (b) and the distances.

It is convenient to convert the phase angle units to cycles and the distances to wavelengths. When this is done, Equation 17 becomes $$T_b = M + (R_a - R_b) \qquad (18)$$

where $T_b$ is in cycles of phase angle and $R_a$, $R_b$ and M are in wavelengths of frequency (b).

Since $R_a$ and $R_b$ are the distances of S from two fixed points, Fig. 3, Equation 18 represents a family of hyperbolae of constant phase difference such as the line T, about the stations A and B as foci. For each value of $T_b$ there is associated a unique hyperbola.

Figure 4:
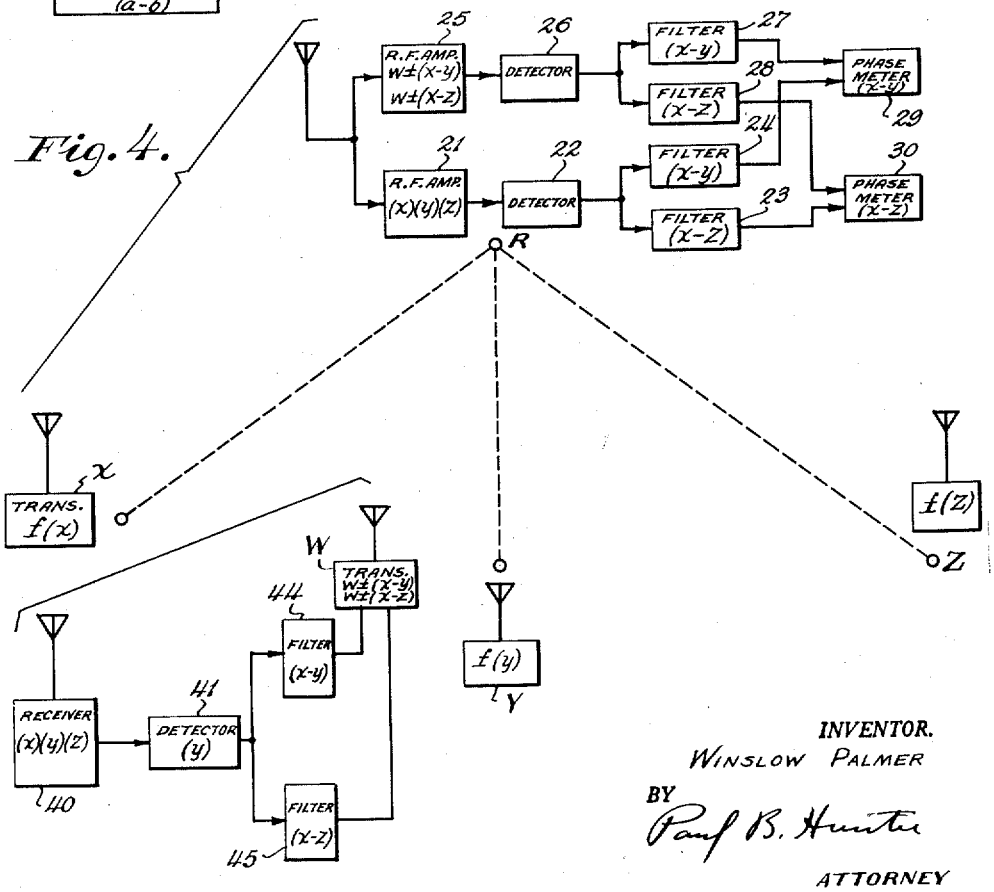

Fig. 4 illustrates a system for determining a navigational fix. There are three transmitters X, Y and Z, suitably separated, and the position to be determined is designated as R. The transmitters Y and Z are continuous wave transmitters of ordinary crystal controlled stability, transmitting frequencies (y) and (z) respectively.

Located at transmitter X station, there is a receiver 40 which is adapted to receive the three frequencies (x), (y) and (z) and its output is fed to detector 41. The detector 41 output is fed to filters 44 and 45, their outputs being respectively difference frequencies (x—y) and (x—z). These difference frequencies are fed to a fourth transmitter W which transmits a carrier frequency (w) modulated with the two difference frequencies.

The receiving apparatus at R comprises two radio frequency amplifiers 21 and 25. Amplifier 21 receives frequencies (x), (y) and (z). These three frequencies are mixed in detector 22 and the desired beat frequency (x—y), is extracted by filter 24 and the desired beat frequency (x—z) is extracted by filter 23. The R.F. amplifier 25 receives (w) and its modulation frequencies (x—y) and (x—z) which are demodulated in detector 26, and the modulation frequencies are separated in filters 27 and 28. The separately derived (x—y) frequencies are compared in phase meter 29 and separately derived (x—z) frequencies are compared in phase meter 30. The reading of each [phasemeter] *phase meter* determines one of the intersecting hyperbolic loci of positions one in range (y—x) and the other in range (y—z) thereby determining a navigational fix of the position R relative to the location of the three transmitting stations.

The frequency (w) was suggested as the most direct means for obtaining the reference modulation frequency (x—y) and (x—z) at the receiver. This frequency (w) may be eliminated by providing that the beat frequencies generated in mixers 44 and 45 be modulated upon transmitter X. To do this the beat frequencies are divided by some small integer (p) in order that they may be later separated.

Figure 5:
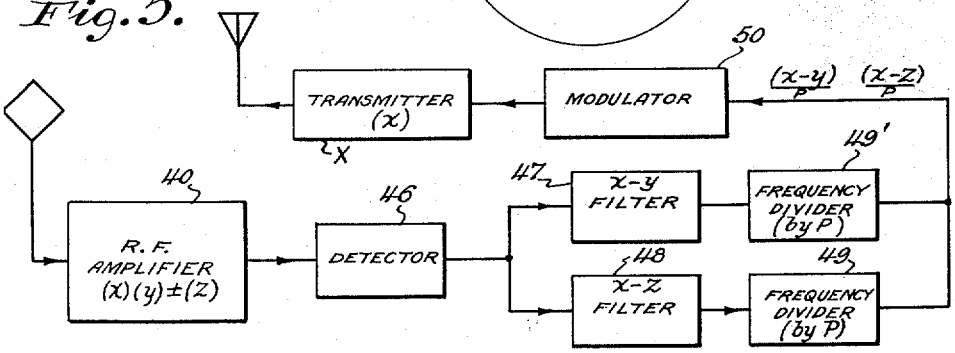
Figs. 4, 5 and 6 are schematic black diagrams illustrative of continuous [waves] *wave* hyperbolic navigation system.

Fig. 5 shows the equipment required at transmitter X location in order to accomplish this result. In this case, the three frequencies (x), (y) and (z) are all received as before in receiver 40, mixed in detector 46, and then fed to filters 47 and 48 which extract the proper beat frequencies (x—y) and (x—z). Each of these frequencies is divided by the same divisor P in the frequency dividers 49 and 49', thus providing $$\frac{(x-y)}{P} \text{ and } \frac{(x-z)}{P}$$

which modulate transmitter X by means of modulator 50.

Figure 6:
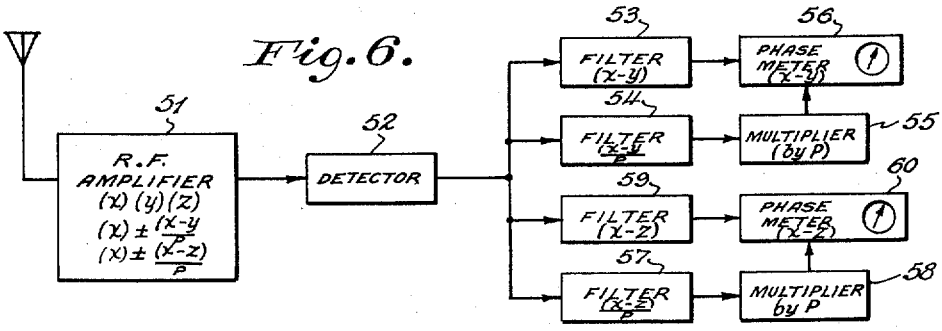

The cooperating equipment at the receiving location R is illustrated in Fig. 6 and comprises a radio frequency amplifier 51 which receives the three carrier frequencies (x), (y) and (z), plus the frequencies modulated upon the carrier frequency x, namely $$\frac{(x-y)}{P} \text{ and } \frac{(x-z)}{P}$$

All of these frequencies are mixed in detector 52, the output of which is connected to four filters which extract the modulated beat frequencies, and the directly derived beat frequencies as follows; filter 53 extracts frequency (x—y), filter 54 extracts frequency $$\frac{(x-y)}{P}$$

filter 59 extracts frequency (x—z) and filter 57 extracts frequency $$\frac{(x-z)}{P}$$

The frequency $$\frac{(x-y)}{P}$$

is fed from filter 54 to multiplier 55 which multiplies by the same factor P and thereby restores it to the original frequency (x—y). It is then fed to phase meter 56 in which it is compared with the directly derived beat frequency (x—y) thereby giving an indication of the phase difference and determines a hyperbolic locus of position in the range (y—x). The frequency $$\frac{(x-z)}{P}$$

is fed from filter 57 to multiplier 58 where it is multiplied by the same factor P and restored to its original frequency (x—z). It is then fed to phase meter 60 where it is compared with the directly derived frequency (x—z) obtained from filter 59 and provides a reading of the phase difference, and determines a hyperbolic locus of position in the range (y—z) which intersects the first hyperbolic line of position.

All of the systems previously described are subject to cyclic ambiguity of phase shift. This problem is solved in the present invention by operationg two systems similar to those already described, side by side, simultaneously, on different frequencies. The two systems, in addition to their own indications, then cooperate to provide a third system based upon a wavelength corresponding to the difference frequency between the two systems. The ambiguous regions of this longer system difference wavelength are fewer in number. This system difference concept may be visualized by considering two rotating vectors of different frequencies. Assume they both start from a zero position at zero time and therefore the higher frequency vector immediately starts to lead the lower frequency vector. At a certain time T the higher frequency vector will overtake the lower frequency vector, and this time T is equal to the period of their difference frequency. In other words, the difference frequency has been phase shifted one full cycle in this time T. By measuring a phase shift of this system difference frequency, of less than one full cycle, we may resolve cyclic ambiguity in the phase shift readings of the higher frequencies. In addition the system may be so arranged that the modulation frequency of one [ssytem] *system* is transmitted in one station and the modulation frequency of the other system is transmitted in the other station. If now, the modulation frequencies of the two system are synchronized, then the phase comparison of the modulation frequencies at the receiving location will form a third system based upon wavelengths of the modulation frequencies. This will be explained in detail hereinafter.

If the frequency difference between the systems is between 2% and 5% of the carrier frequencies and the modulation frequency is between 2% and 5% of the difference frequency, then the resolution of the difference frequency system will be less than the wavelength of the carrier frequencies, and the resolution of the modulation frequency system will be less than the wavelength of the difference frequency system, so that the entire group of systems operating together have an accuracy proportional to the carrier frequency system and an unambiguous range proportional to the modulation wavelength.

Fig. 7 is a block diagram of a two station system which can define lines of position without cyclic ambiguity. A third station is required for a navigational fix but it has been omitted as it is not required in the illustration of how the cyclic ambiguity is resolved.

At station B′ there is a transmitter 72 which transmits a frequency (b). At station A′ there is a transmitter 61 that transmits a carrier frequency (a) which differs from (b) by a low beat frequency (a—b). Receiver 62 at location A′ receives frequencies (a) and (b), amplifies them and extracts the beat frequency (a—b). Frequency divider 64 divides this frequency by a factor K and modulates the transmitter 61 through modulator 65 with the divided beat frequency.

At the position to be determined S, an R.F. amplifier 77 picks up the frequencies (a) and (b) plus the modulation on frequency (a). Filters 79 and 80 extract the frequencies (a—b) and a divided frequency $$\frac{(a-b)}{K}$$

The divided frequency is then fed to a multiplier 83 which multiplies by the same factor K thus restoring the original frequency (a—b). These two frequencies are then compared in a phase meter 85 giving a phase angle difference $\theta_1$.

At station A′ there is another transmitter 66 which transmits a frequency (d) which differs from frequency (a) by a few percent. At station B′, a transmitter 67 transmits a frequency (e), and a receiver 68 receives frequencies (d) and (e) and generates a low beat frequency (d—e) which is equal to (a—b). A frequency divider 70 connected to receiver 68 generates the modulation frequency $$\frac{(d-e)}{K}$$

which is modulated upon the transmitter 67 by means of modulator 71.

The frequency $$\frac{(d-e)}{K}$$

is also fed from the frequency divider 70 to the phase detector 75. The frequency $$\frac{(a-b)}{K}$$

is also supplied to the phase detector 75 from the receiver 73. These two divided frequencies are compared in phase by the phase detector 75 which provides an "error" voltage proportional to the phase difference to the frequency controller 76 which changes the frequency (b) of transmitter 72 proportionally to the "error" signal in order to reduce the phase difference at phase detector 75 to zero. Therefore, this operation synchronizes the modulation frequencies of the two different systems.

At the position to be determined, S, radio frequency amplifier 78 receives frequencies (d) and (e) and the modulation frequency $$\frac{(d-e)}{K}$$

The amplifier 78 is connected to two filters 81 and 82 which extract the frequencies (d—e) and $$\frac{(d-e)}{K}$$

respectively. The frequency $$\frac{(d-e)}{K}$$

is fed to a multiplier 84 which multiplies by K and this multiplied frequency is supplied to phase meter 87 where the separately derived (d—e) frequencies are compared in phase, producing phase angle difference $\theta_2$.

The outputs of the two multipliers 83 and 84 are supplied to a third phase meter 86 where the *multiplied* modulation frequencies are compared in phase, giving phase angle difference $\theta_3$.

From Equation 17 it is seen that the phase difference $\theta_1$ read in phase meter 85 is a function of the distances $(M+R_a-R_b)$ in terms of the wavelength of (b), as follows:

$$\theta=\frac{2\pi b}{C}(M+R_a-R_b) \qquad (19)$$

similarly, the phase difference $\theta_2$ measured by phase meter 87 equals $$\theta_2=\frac{2\pi d}{C}(M+R_b-R_a) \qquad (20)$$

Equation 19 shows that $\theta_1$ is proportional to a constant term M plus the difference between distances $R_a$ and $R_b$ in terms of the [wave-length] *wavelength* of frequency (b).

Similarly Equation 20 shows that $\theta_2$ is proportional to a constant term M plus the difference between the distances $R_a$ and $R_b$ in terms of the wavelength of frequency (d).

Accordingly, therefore, $\theta_1$ or $\theta_2$ may be read and this reading will define a hyperbola of constant phase difference between $R_a$ and $R_b$, exactly as in standard loran procedure wherein a constant time difference is measured. This measurement is in terms of the wavelength of the carrier frequency used, and the accuracy of the measurement is approximately one-hundredth of a wavelength of the carrier frequency, as that amount of phase difference may be conveniently measured.

However, in order to avoid cyclic ambiguity in the above "fine" measurement, "coarse" and "medium" measurements at lower frequencies are provided as will be shown in the following discussion.

If $\theta_1$ and $\theta_2$ are added we have the following:

$$\theta_1+\theta_2=\frac{2\pi M}{C}(b+d)+\frac{2\pi}{C}(b-d)(R_a-R_b) \qquad (21)$$

Equation 21 shows that $\theta_1+\theta_2$ is equal to a constant term plus the difference between $R_a$ and $R_b$ in terms of the wavelengths of the system difference frequency (b—d). Therefore, the reading of $\theta_1+\theta_2$ in indicator 88 will enable the resolution of cyclic ambiguity in the carrier frequency reading $\theta_1$.

The phase angle $\theta_3$ between the two [modulation] *low beat* frequencies which is determined by phase meter 86 is likewise dependent upon the difference of the distances to the two transmitting stations A and B. This can be shown as follows:

From Equation 15 we see that the [modulation] *low beat* frequency; *i.e., the output of the multiplier 83; derived* in the navigation receiver at S *from the modulation component of the wave* received from station A, is:

$$C_{m_a}=E_{m_a}\cos\left[2\pi(a-b)t+\frac{2\pi}{C}(a-b)R_a+\frac{2\pi bM}{C}\right] \qquad (22)$$

Likewise the [modulation] *low beat* frequency; *i.e., the output of the multiplier 84; derived from the modulation component of the carrier e* received from station B [upon carrier e] is:

$$C_{m_b}=E_{m_b}\cos\left[2\pi(d-e)t+\frac{2\pi}{C}(d-e)R_a-\frac{2\pi eM}{C}\right] \qquad (23)$$

Remembering that the frequency control 76 at station B makes the beat frequencies synchronous, so that $$(a-b)=(d-e)$$

the phase angle between the [modulation] *low beat* frequencies *from the multipliers 83 and 84* at the receiver is $\theta_3$, where $$\theta_3=\frac{2\pi}{C}(a-b)(R_a-R_b)+\frac{2\pi M}{C}(b+e) \qquad (24)$$

Equation 24 shows that the phase angle $\theta_3$ between the modulation frequencies is likewise dependent upon the difference of the distances to the two stations, with the indication in terms of wavelengths of the [modulation] *low* beat frequency (a—b). The reading of this phase angle $\theta_3$, obtained from phase detector 86, provides a "coarse" reading at the longer modulation wavelength which resolves the cyclic ambiguity in the higher frequency "medium" reading, $(\theta_1+\theta_2)$.

In developing the equations for the phase angles, all of the delays, including fixed delays such as those due to the time of transit of the various waves between stations, were included. However, the zero reference for the phase angles may be shifted to the line where $R_a=R_b$, and the Equations 19, 20 and 24 for the phase angles $\theta_1$, $\theta_2$ and $\theta_3$ would become $$\frac{\theta_1}{2\pi}=\left(\frac{b}{c}\right)\Delta R=\frac{\Delta R}{\lambda_b} \qquad (25)$$

where $\theta_1$ is proportional to $\Delta R$ in terms of the wavelength of frequency b $$\frac{\theta_2}{2\pi}=-\left(\frac{d}{c}\right)\Delta R=\frac{\Delta R}{\lambda_d} \qquad (26)$$

where $\theta_2$ is proportional to $\Delta R$ in terms of the wavelength of frequency d $$\frac{\theta_3}{2\pi}=\left(\frac{a-b}{C}\right)\Delta R=\frac{\Delta R}{\lambda_{(a-b)}} \qquad (27)$$

where $\theta_3$ is proportional to $\Delta R$ in terms of the wavelength [modulation] *low beat* frequency (a—b) where $$\Delta R=R_a-R_b \qquad (28)$$

and $\lambda$ represents the wavelength of the subscript frequency. Also; from Equation 21, dropping the constant term $$\frac{2\pi M}{C}(b+d)$$

we have $$\frac{\theta_1+\theta_2}{2\pi}=\left(\frac{b-d}{C}\right)\Delta R=\frac{\Delta R}{\lambda_{(b-d)}} \qquad (29)$$

where $\theta_1+\theta_2$ is proportional to $\Delta R$ in terms of the wavelength of system difference frequency (b—d).

It has already been stated that the system difference frequency (b—d) should be between 2% and 5% of the average carrier frequency (b), and that the modulation frequency (a—b) should be between 2% and 5% of the system difference frequency. Hence $$\lambda_{(a-b)}>\lambda_{(b-d)}>\lambda_b \qquad (30)$$

and a preferable ratio is 400:20:1.

The phase shifters can be expected to measure to about 1% of a cycle, hence $\theta_3$ will indicate $\Delta R$ to about $$.01\lambda(a-b)$$

which is less than $\lambda(b-d)$, and $\theta_1+\theta_2$ will indicate $\Delta R$ to about $.01\lambda(b-d)$ which is less than $\lambda(b)$.

Therefore the system will resolve all ambiguities in up to full wavelengths of the modulation frequency.

In a specific instance the carrier frequencies may be approximately 78 kc. and 82 kc., the system difference frequency about 4 kc., and the [modulation] *low beat* frequency about 200 cycles. A wavelength at 200 cycles is 932 miles. Since the maximum phase shift is twice the baseline, in wavelengths, a system with a 450 mile baseline between stations would have no ambiguities with a carrier frequency approximately of 80 kc.

Fig. 8 is a block diagram of a three station system, which is the required number of stations to provide a navigational fix. This system is similar to that of Fig. 7 with the addition of a third station C, which is essentially similar to station B. Station B is identical with station B of Fig. 7 and cooperates with station A, as described in connection with Fig. 7, to define the hyperbola O of constant phase difference in the range AB.

Station C cooperates with station A in a similar manner to define a hyperbola P in the range AC. This is done with the same technique as described in detail in connection with Fig. 7. However, different frequencies must be used in order to differentiate the signals at the receiving location.

Station C generates a frequency (c) in transmitter 72' and a frequency (f) in transmitter 67'. Receiver 68' receives frequencies (d) and (f) and receiver 73' receives frequencies (a) and (c). Frequencies (a—c) and (d—f) are compared in phase detector 75' and synchronized through the operation of frequency controller 76' which controls the frequency (c) of transmitter 72'. The difference frequency (d—f) is also modulated on carrier (f) of transmitter 67'. All of the above mentioned units of station C are the same as those of station B with the exception that different frequencies are used.

Station A is the same as in Fig. 7 except that a second filter divider 64' has been added to the output of receiver [61] *62'* to extract the frequency.

$$\frac{(a-c)}{K}$$

from the output of receiver [61] *62'* in addition to the *signal extracted by the filter divider 64 at* frequency.

$$\frac{(a-b)}{K}$$

Both of these filters contain frequency dividers which divide by a factor K and both of these frequency divided modulations are applied to a carrier frequency A of transmitter [61] *61'*.

Figure 8A:
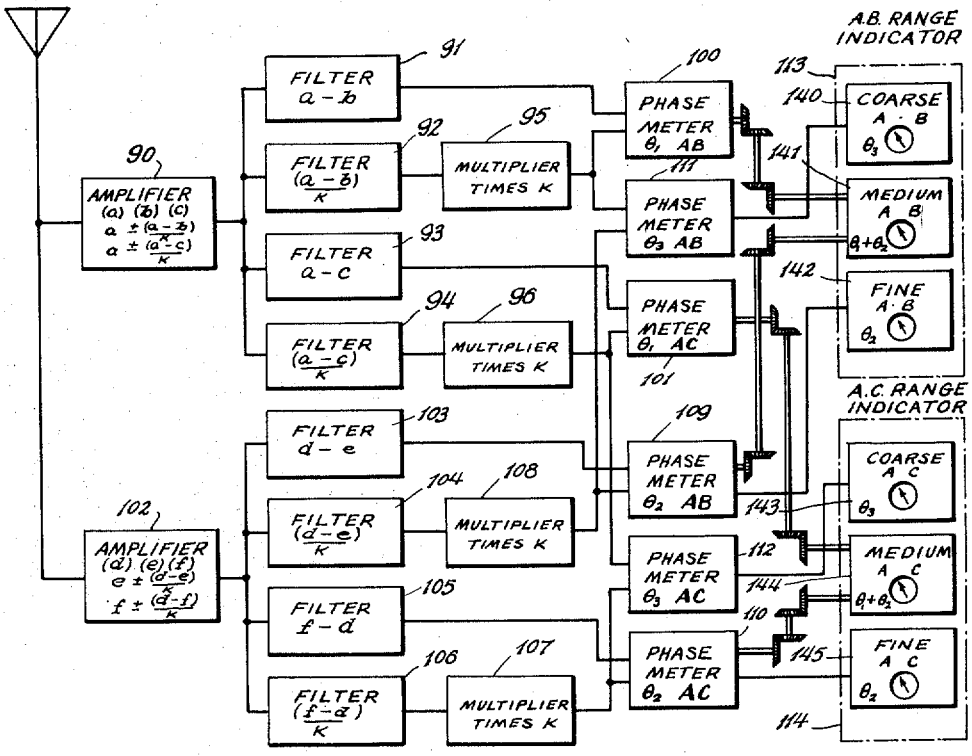

The equipment at the receiving location S, shown in Fig. 8A, is similar to that of Fig. 7 but it contains two extra filters to take care of the additional frequencies. It comprises a radio frequency amplifier 90 which receives frequencies (a), (b), (c)

$$a\pm\frac{(a-b)}{K} \text{ and } a\pm\frac{(a-c)}{K}$$

The output of this R.F. amplifier is applied to four filters 91, 92, 93 and 94 which extract respectively frequencies $$(a-b),\ \frac{(a-b)}{K},\ (a-c) \text{ and } \frac{(a-c)}{K}$$

The divided modulation frequencies are multiplied by the multipliers 95 and 96 to restore the original frequencies (a—b) and (a—c). The separately derived (a—b) frequencies are applied to a [phasemeter] *phase meter* 100 providing a measurement of $\theta_1$ in the AB range, and the separately derived (a—c) frequencies are applied to a phase meter 101, providing a measurement of $\theta_1$ in the AC range.

A second R.F. amplifier 102 receives frequencies (d), (e), (f)

$$e\pm\frac{(d-e)}{K} \text{ and } f\pm\frac{(e-f)}{K}$$

The output of R.F. amplifier 102 is connected to four filters 103, 104, 105 and 106, which extract respectively frequencies $$(d-e),\ \frac{(d-e)}{K},\ (f-d) \text{ and } \frac{(f-d)}{K}$$

The two divided frequencies are multiplied by a factor of K in the multipliers 107 and 108 to restore the original frequencies. The separately derived (d—e) frequencies are compared in phase meter 109, providing a measurement of $\theta_2$ for the AB range; and separately derived (f—d) frequencies are compared in phase meter 110, providing a measurement of $\theta_2$ in the AC range.

The [modulation] *low beat* frequencies (a—b) and (d—e) *from multipliers 95 and 108* are applied to phase meter 111 where they are compared to give the "coarse" measurement $\theta_3$ of the phase difference in the AB range. As previously explained, this "coarse" position is based upon the long and therefore unambiguous wavelength of the [modulation] *low beat* frequency (*a—b*).

The (a—c) [modulation] *low beat* frequency and the (f—d) [modulation] *low beat* frequency are similarly compared in the phase meter 112 to provide a measurement of $\theta_3$ in the AC range.

The $\theta$ readings in the AB range are combined in indicator 113 to thereby provide a "coarse," a "medium" and a "fine" reading which will identify hyperbola O.

The $\theta$ readings in the AC range are combined in indicator 114 to thereby provide a "coarse," a "medium" and a "fine" reading which will define hyperbola P.

In the AB range indicator 113 the "coarse" reading is provided by indicator 140 which merely repeats the reading $\theta_3$ of phase detector 111. The "medium" reading is provided by indicator 141 which adds the $\theta_1$ reading from phase detector 100, and the $\theta_2$ reading from phase detector 109. This addition may be done mechanically as by a differential. The "fine" reading is provided by indicator 142 which repeats the $\theta_2$ reading of phase detector 109.

In the AC range indicator 114 the "coarse" reading is provided by indicator 143 which repeats the $\theta_3$ reading of phase meter 112. The "medium" reading is provided by indicator 144 which adds $\theta_1$ reading from phase detector 101 and the $\theta_2$ reading from phase detector 110. The "fine" reading is provided by indicator 145 which repeats $\theta_2$ reading which is derived by phase detector 110.

The readings from indicators 113 and 114 may be referred to a previously prepared chart such as used with standard loran, in order to determine the navigational fix.

One method of combining the three dial readings in indicators 113 and 114 to get a composite reading, may be illustrated in a typical example as follows:

Assume we have two transmitting stations M and N separated by ½λ of the (modulation) frequency. Then as a receiver is moved from M to N, remembering the frequency ratio of carrier:system difference:modulation is 400:20:1, the values are chosen so that:

The "coarse" dial ($\theta_3$) will turn 1 revolution,
The "medium" dial ($\theta_1+\theta_2$) will turn 20 revolutions, and
The "fine" dial ($\theta_1$) will turn 400 revolutions.

It must be noted that as a receiver is moved ½λ from one station, it also moves ½λ closer to the other station, so that the total phase difference is 1λ.

The dials may be conveniently calibrated in arbitrary distance units, the total distance being 400 units such that:

1 revolution of the "fine" dial=1 unit
1 revolution of the "medium" dial=20 units
1 revolution of the "coarse" dial=400 units Suppose the receiver is put at the location to be determined, which is in fact, .632 of the total distance, or 252.8 distance units along the line joining the two stations. The phase angle difference $\theta_1$ will be $$\frac{252.8}{2}$$

cycles, i.e., if the receiver had been moved from the point of zero distance, the "fine" dial would have turned 252.8 revolutions. The number of complete cycles are not indicated on the dial, and therefore, the "fine" dial reading is .8 revolution which is equal to .8 units.

Similarly, if the receiver had been moved from zero the "medium" dial would have turned 20×.632=12.64 revolutions. As the full cycles are not indicated, the only significant portion is .64 revolutions which, as the dial has 20 distance units per revolution is equal to 12+ units.

Similarly, if the receiver had been moved from zero position, the "coarse" dial would have turned .632 revolutions. As this dial is calibrated with 400 distance units the reading to its allowable tolerance will be 240+ units.

The operator may add the readings to obtain the position in distance units equal to 252.8 units.

Alternatively, an additive mechanism might easily be provided to furnish the final reading without any computation on the operator's part.

The dial markings must be chosen to be read with an accuracy, proportional to the allowable tolerance in that particular part of the system. The lower frequency dials resolve cyclic ambiguity of phase shift of the highest frequency, without regard to the previous history of motion of the receiver. The receiver does not have to be set at a known location and kept in continuous operation, which would be the case if the "medium" and "coarse" dials were merely cycle counters of the "fine" dial. The equipment may be turned on, at the unknown location without any pre-setting and will immediately give the correct reading.

Figure 9:
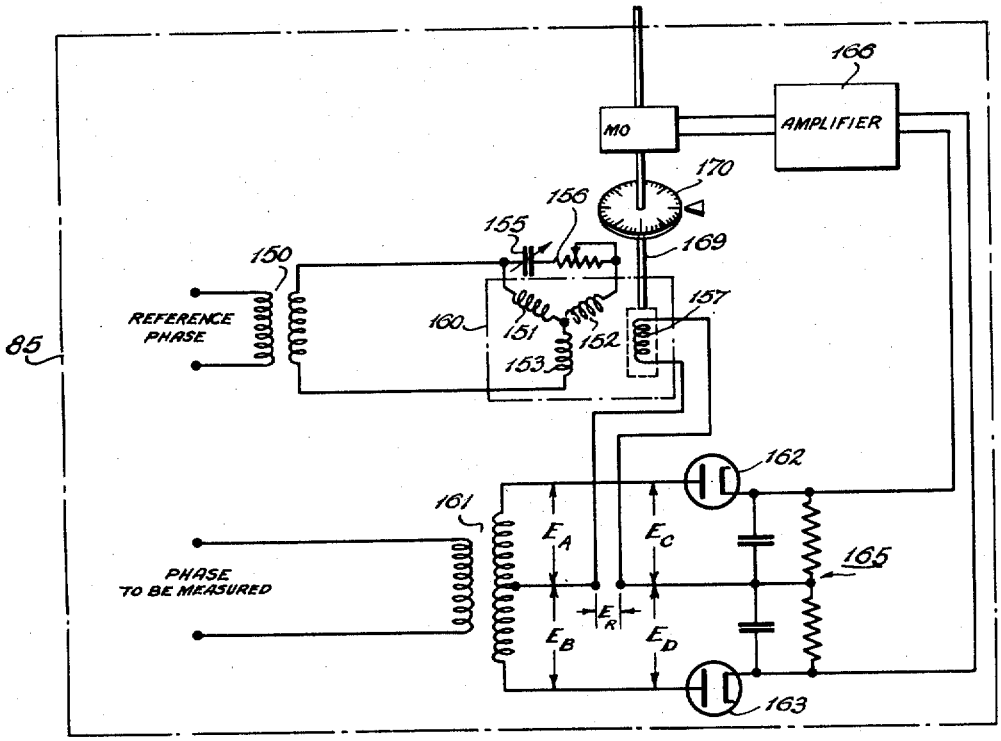
Fig. 9 is an embodiment of phase meter apparatus adapted for use in the invention.

Fig. 9 illustrates apparatus to indicate phase difference which may be used in the phase meters such as 85, 86 and 87 of Fig. 7. The reference phase voltage is connected to the input transformer 150, the secondary of which is connected to a phase-splitting network for the purpose of dividing the single phase input into a three phase voltage to energize the stator windings 151, 152 and 153 of self-synchronous transformer or Selsyn 160. The phase-splitting circuit, comprising adjustable condenser 155 and adjustable resistor 156, is connected across stator arms 151 and 152. The values of condensers 155 and 156 are chosen so as to provide a balanced three phase voltage across the three stator arms when a single phase voltage is applied to the input.

The rotor 157 of the Selsyn 160 is adapted to be turned by motor 158 and shaft 169 to thereby produce a phase shifted Selsyn output voltage across the rotor 157 winding. The beat frequency phase voltage to be compared with the reference phase voltage is applied to the primary of transformer 161, and each end of the secondary of the transformer 161 is connected to the plates of a pair of diodes 162 and 163. The cathodes of the diodes are connected to a balanced resistor-capacitance network 165. The reference phase voltage ($E_R$) output from the rotor 157 is connected between the center tap of the secondary of transformer 161 and the center of the balanced output network 165.

Figure 10:
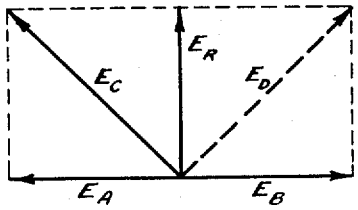
Figs. 10 and 11 are vector diagrams illustrative of the operation of the phase meter of Fig. 9.

When the two signals are in phase, the zero position of rotor 157 is chosen so that $E_R$ is 90° out of phase with $E_A$ and $E_B$ as shown in Fig. 10. The resulting voltage vectors $E_C$ and $E_D$, are equal in amplitude and their rectified outputs balance each other in the network 115 providing zero output.

Figure 11:
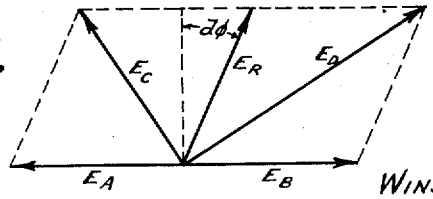

If there is a phase shift in one direction as illustrated in Fig. 11, the amplitude of $E_D$ becomes larger and the amplitude of $E_C$ becomes smaller. If the phase shift had been in the opposite direction $E_C$ would have become larger and $E_D$ smaller. These two voltages $E_C$ and $E_D$ are rectified in the diodes 162 and 163 and these rectified voltages are opposed in network 165, thereby providing a D.C. error voltage whose amplitude and polarity is proportional to the magnitude and sense of the phase difference.

This error voltage generated across the output network 165 is applied to the input of amplifier 166 which energizes motor 158 so as to turn rotor 157 in a direction which will reduce the phase difference to zero. When this is done the desired phase reading $\theta_1$, $\theta_2$, or $\theta_3$ may be read from dial 170.

Thus it is seen that cyclic ambiguity is resolved by utilizing two channels slightly separated in frequency. The difference frequency between the channels may be effectively utilized as a second system whose wavelength is long enough so that its phase shift is substantially unambiguous. This longer wavelength system is used as a "medium" reading to resolve ambiguity in the "fine" high frequency readings. A further extension of the non-ambiguous range is obtained by using synchronized low frequency modulation signals on the above-mentioned pair of carrier channels. These modulation frequencies are utilized as a third "coarse" system having a [wave length] *wavelength* long enough to resolve ambiguities in the "medium" system.

These various frequencies must be suitably chosen to obtain the best coverage. A ratio of approximately 20 to 1 between the carrier frequency and the difference frequency between the carrier channels, and a similar ratio of approximately 20 to 1 between the system difference frequency and the *low beat signal used to develop the* modulation frequency has been found preferable in one embodiment of the invention. The actual choice of frequencies must be governed by design considerations such as, coverage desired, length of available baseline, frequencies available and propagation and other factors.

Since many changes could be made in the above construction and many apparently widely different embodiments of this invention could be made without departure from the scope thereof, it is intended that all matter contained in the above-description or shown in the accompanying drawings shall be interpreted as illustrative and not in a limiting sense.

What is claimed is:

[1. In a radio navigation system of the type wherein continuous wave signals are transmitted from three separate locations, and first and second beat frequency waves derived from said three signals are transmitted separately from said transmitting locations; a receiver, comprising first receiving means adapted to receive said first three signals, second receiving means adapted to receive said first and second beat frequencies, detecting means responsive to said first receiving means to obtain said first and second beat frequencies directly from said first three signals, filter means responsive to said second receiving means to separate said first and second beat frequencies, first phase comparison means responsive to said filter means and said detecting means to compare in phase said separately received first beat frequencies, second phase comparison means responsive to said filter means and said detecting means to compare in phase said separately received second beat frequencies.]

[2. In a radio navigation system of the type wherein continuous wave signals are transmitted from three separate locations, and first and second beat frequency waves derived from said three signals are transmitted as a modulation from said transmitting locations; a receiver comprising means to receive said three continuous wave signals, means responsive to said receiving means to obtain said first and second beat frequencies by mixing said three continuous wave signals, filter means responsive to said receiving means to obtain said first and second beat frequency modulations, and first phase comparison means to compare in phase said first beat frequency and said first beat frequency modulation signals, and second phase comparison means to compare in phase said second beat frequency and said second beat frequency modulation signals.]

[3. In a radio navigation system of the type wherein continuous wave signals are transmitted from three separated locations, and first and second beat frequency waves derived from said three signals are transmitted as a modulation from said transmitting locations; a receiver comprising means to receive said three continuous wave signals including said modulations, detecting means responsive to said receiving means, first filter means responsive to said detecting means to obtain said first beat frequency, second filter means responsive to said detector means to obtain said first beat frequency modulation, phase comparison means responsive to said first and second filter means to compare the phase thereof, third filter means responsive to said detecting means to obtain said second beat frequency, fourth filter means responsive to said detector means to obtain said second beat frequency modulation and phase comparison means responsive to said third and fourth filter means to compare the phase thereof; to thereby determine the position of said receiving location with reference to predetermined hyperbolic lines of position relative to said three transmitting locations.]

4. Means to obtain navigational position by radio means without cyclic ambiguity comprising means to transmit a first continuous wave signal from a first location, means to transmit a second continuous wave signal from a second location, means to receive said first and second signal at said first location and means connected to said receiving means to mix said first and second signals to thereby obtain a beat frequency, means to divide said beat frequency, means to modulate said first signal with said divided beat frequency, means to transmit a third continuous wave signal from said first location, means to transmit a fourth continuous wave signal from said second location, means to receive said third and fourth continuous wave signals at said second location, means to mix said third and fourth received signal and to divide the resultant beat frequency, means to modulate said fourth continuous wave signal with said divided beat frequency, receiving means at said second location adapted to receive said first and second signals, means to mix said first and second signals to obtain a beat frequency including means to divide said beat frequency, phase comparison means connected to said third receiving means and to said modulating means and adopted to measure the phase difference between the divided beat frequency of said first and second signals and the divided beat frequency of said third and fourth signals, frequency control means responsive to said phase detecting means adapted to vary the frequency of said second signal transmitting means to reduce said phase difference to zero, receiving means at a third location adapted to receive said first and second signals, filter means connected to said receiving means adapted to obtain the beat frequency between said first and second signals, second filter means connected to said receiving means adapted to obtain said divided beat frequency of said first and second signals first multiplication means connected to said divided filter adopted to multiply said divided frequency to its original value, first phase detecting means connected to said multiplication means and said first filter means, second receiving means at said third location adapted to receive said third and fourth signals, third filter means connected to said second receiving means adapted to obtain the beat frequency of said third and fourth signals, fourth filter means connected to said receiving means and adapted to obtain the divided beat frequency, of said third and fourth signals, second multiplication means connected to said divided frequency filter means, to restore said divided beat frequency to its original value, second phase detecting means connected to said third filter means and said second multiplication means to measure the phase difference therebetween, and third phase detecting means connected to said first and second multiplication means to measure the phase difference therebetween.

5. Means for obtaining a locus of navigational position by radio means without cyclic ambiguity, comprising means for obtaining a beat frequency at the receiving location from a pair of signals received from separate transmitting locations, means for obtaining said beat frequency at the first of said transmitting locations and separately transmitting it to said receiving location as a modulation, means for obtaining a second beat frequency at said receiving location from a second pair of signals received from said separate transmitting locations, means for obtaining said second beat frequency at the second of said transmitting locations and transmitting it to said receiving location as a modulation, means for compairing the phase of said separately received first beat frequencies at said receiving location, means for comparing the phase of said separately received second beat frequencies at said receiving location and means for comparing the phase of said separately received modulation frequencies at said receiving location to thereby determine the hyperbolic locus of positions of said receiving location relative to said transmitting locations with accuracy proportional to the highest frequency and without cyclic ambiguity.

6. Means for resolving cyclic ambiguity in continuous wave navigation systems, comprising means for obtaining a beat frequency at a receiving location from a pair of signals received from separate transmitting locations, means for deriving said beat frequency separately at the first of said transmitting locations and transmitting it to said receiving location as a modulation, means for obtaining a second beat frequency at said receiving location from a second pair of signals received from said separate transmitting locations, means for deriving said second beat frequency at the second of said transmitting locations and transmitting it to said receiving location, means for obtaining said first beat frequency at said second location, means for comparing the phase at said second location of said first and second beat frequencies and means for controlling the frequency of the signal of said first pair of signals transmitted from said second location to reduce the phase difference to zero, and means at said receiving location means for comparing the phase of said first beat frequencies, means for comparing the phase of said second beat frequencies and means for comparing the phase of said modulation beat frequencies.

7. Means for obtaining a navigational fix by radio means without cyclic ambiguity, comprising means for obtaining a beat frequency at a receiving location from a pair of signals received from separate transmitting locations, means for deriving said beat frequency separately at the first of said transmitting locations and transmitting it to said receiving location as a modulation, means for obtaining a second beat frequency at said receiving location from a second pair of signals received from said separate transmitting locations, means for deriving said second beat frequency at the second of said transmitting locations and transmitting it to said receiving location, means for obtaining said first beat frequency at said second location, means for comparing the phase at said second location of said first and second beat frequencies and controlling the frequency of the signal of said first pair of signals transmitted from said second location to reduce the phase difference to zero, means for comparing the phase of said first beat frequencies, means for comparing the phase of said second beat frequencies and means for comparing the phase of said modulation beat frequencies at said receiving location.

8. A coarse and fine hyperbolic navigation system comprising, means at at least two separate locations to transmit at least two continuous wave signals each, means at at least one of said locations to receive said signals, means responsive to said receiving means to generate subharmonic modulation products from said signals, and means to retransmit said modulation products to thereby establish coarse and fine hyperbolic lines of position relative to said locations.

9. Craft receiving means comprising means to receive signals from two separate locations, means responsive to said first means to detect modulation products from said signals, means to receive separate subharmonic modulation products from at least one of said locations, means to compare said modulation products to thereby determine the craft position relative to said locations, and means to resolve ambiguities of said comparison.

10. Navigation apparatus comprising means to receive a plurality of separate frequency signals and a plurality of separate modulations, means to generate a plurality of modulation products from said signals, means to compare in phase said modulations with said generated modulation products, means to indicate said phase difference in terms of two of said signal wavelengths, and means to resolve cyclic ambiguity of each of said phase differences including means to combine said phase differences.

11. A coarse and fine navigation system comprising, first and second continuous wave hyperbolic navigation systems of the type transmitting nonsynchronous continuous wave signals from separate transmitters and transmitting a beat frequency reference modulation from one of the transmitters, first and second receiving means responsive to the frequencies of said first and second transmitting systems to measure distance, means to resolve cyclic ambiguity of measurement of said first and second systems comprising third receiving means responsive to the difference frequency between said first and second transmitting systems.

12. A coarse and fine navigation system comprising, first and second continuous wave hyperbolic navigation systems of the type transmitting nonsynchronous continuous wave signals from separate transmitters, and transmitting a beat frequency reference modulation from one of the transmitters, first and second receiving means responsive to the frequencies of said first and second transmitting systems and having first and second phasemeters to measure distance, means to resolve cyclic ambiguity of measurement of said first and second systems comprising means for adding the outputs of said first and second phasemeters to provide a distance measurement in terms of the difference frequency between said first and second transmitting systems.

13. A coarse, medium and fine navigation system comprising, first and second continuous wave hyperbolic navigation systems of the type transmitting nonsynchronous modulated continuous wave signals from separate transmitters and transmitting a beat frequency reference modulation from one of the transmitters, first and second receiving means responsive to the frequencies of said first and second transmitting systems, means to resolve cyclic ambiguity of measurement of said first and second systems comprising third receiving means responsive to the difference frequency between said first and second transmitting systems, and means to resolve cyclim ambiguity of said system difference frequency distance measurement comprising fourth receiving means responsive to said modulation frequency.

14. A coarse, medium and fine navigation system comprising, first and second continuous wave hyperbolic navigation systems of the type transmitting nonsynchronous modulated continuous wave signals from separate transmitters and transmitting a beat frequency reference modulation from one of the transmitters, first and second receiving means responsive to the frequencies of said first and second transmitting systems, means to resolve cyclic ambiguity of measurement of said first and second systems comprising third receiving means responsive to the difference frequency between said first and second transmitting systems, and means to resolve cyclic ambiguity of said system difference frequency measurement comprising a phasemeter responsive to said modulation frequency.

*15. In a position indicating system, means for translating space radiated signals into position indications comprising, means for obtaining a first beat frequency signal at a receiving location from a first pair of signals received from separate transmitting locations, means for obtaining a second beat frequency signal at said receiving location from a second pair of signals received from said separate transmitting locations, means at one of said transmitting locations for obtaining said first and second beat frequency signals, means at said one transmitting location jointly responsive to said first and second beat frequency signals for controlling the frequency of at least one of said space radiated signals to maintain the phase difference between said beat frequency signals at a predetermined value and thus maintain the same beat frequency value between said first and second pairs of signals, and means at said receiving location jointly responsive to said first and second beat frequency signals to produce a position indication.*

*16. A wave signal transmission system comprising, a pair of spaced transmitting units, a plurality of pairs of transmitters for radiating signals of different frequencies, said transmitters of each pair being respectively disposed at different transmitting units, means at one of said transmitting units for obtaining a first beat frequency signal from the signals radiated by a first pair of said transmitters, means at said one unit for obtaining a second beat frequency signal from the signals radiated by a second pair of said transmitters, and means at said one unit responsive to at least one of said beat frequency signals for controlling the frequency of at least one of said transmitters to maintain the same beat frequency between said first and second pairs of signals.*

*17. A wave signal transmission system comprising, a pair of spaced transmitting units, a plurality of pairs of transmitters for radiating signals of different frequencies, said transmitters of each pair being respectively disposed at different transmitting units, means at one of said transmitting units for obtaining a first beat frequency signal from the signals radiated by a first pair of said transmitters, means at said one unit for obtaining a second beat frequency signal from the signals radiated by a second pair of said transmitters, and means at said one unit responsive to at least two of said signals for controlling the frequency of at least one of said transmitters to maintain a predetermined phase difference between said beat frequency signals.*

*18. A wave signal transmission system comprising, a pair of spaced transmitting units, a plurality of pairs of transmitters for radiating signals of different frequencies, said transmitters of each pair being respectively disposed at different transmitting units, means at one of said transmitting units for obtaining a first beat frequency signal from the signals radiated by a first pair of said transmitters, means at said one unit for obtaining a second beat frequency signal from the signals radiated by a second pair of said transmitters, means at said one unit for comparing the phase of said beat frequency signals, and means controlled by said phase comparing means for controlling the frequency of at least one of said transmitters to maintain at a predetermined value the phase difference between said beat frequency signals.*

*19. Means for resolving cyclic ambiguity in continuous wave navigation systems, comprising means for obtaining a beat frequency signal at a receiving location from a pair of signals received from separate transmitting locations, means for obtaining a second beat frequency signal at said receiving location from a second pair of signals received from said separate transmitting locations, means for obtaining said first and second beat frequency signals at one of said transmitting locations, means at said one transmitting location jointly responsive to said first and second beat frequency signals for controlling the frequency of at least one of said transmitted signals to maintain at a predetermined value the phase difference between said beat frequency signals, and means at said receiving location for obtaining a position indication in response to said first and second beat frequency signals.*

*20. In a position indicating system, means for translating space radiated signals into position indications comprising, means for obtaining a first beat frequency signal at a receiving location from a first pair of signals received from separate transmitting locations, means for obtaining a second beat frequency signal at said receiving location from a second pair of signals received from separate transmitting locations, means at one of said transmitting locations for obtaining said first and second beat frequency signals, means at said one transmitting location for transmitting a reference signal derived from at least one of said beat frequency signals to said receiving location as a modulation, means at said one transmitting location jointly responsive to said first and second beat frequency signals for controlling the frequency of one of said transmitted signals to maintain at a predetermined value the phase difference between said beat frequency signals, means at said receiving location for comparing the phase of said modulation with the corresponding beat frequency signal to produce one position indication, and means at said receiving location jointly responsive to said first and second beat frequency signals for producing another position indication.*

*21. A wave signal transmission system comprising, a pair of spaced transmitting units, a plurality of pairs of transmitters for radiating signals of different frequencies, said transmitters of each pair being respectively disposed at different transmitting units, means at one of said transmitting units for obtaining a first beat frequency signal from the signals radiated by a first pair fo said transmitters, means at said one unit for obtaining a second beat frequency signal from the signals radiated by a second pair of said transmitters, means at said one unit for modulating a reference signal derived from at least one of said beat frequency signals on the signal radiated by one of said transmitters at said one unit, means at said one unit controlled by the phase relationship between said beat frequency signals for controlling the frequency of the signal radiated by one of said transmitters to maintain the beat frequency between the signals radiated by said first pair of transmitters equal to the beat frequency between the signals radiated by said second pair of transmitters.*

*22. In a position indicating system, means for translating space radiated signals into position indications comprising receiving means for receiving a plurality of pairs of space radiated signals and for heterodyning said received pairs to produce beat frequency signals having frequencies respectively related to the beat frequencies between the signals of each pair, means for receiving at least one modulated space radiated carrier signal and for developing therefrom reference signals having frequencies respectively equal to said beat frequency signals, means for phase comparing an equal frequency pair of said beat frequency signals and reference signals to provide at least one position indication, means for mixing said beat frequency signals and said reference signals, and means responsive to the output of said mixing means for producing at least one other position indication.*

*23. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, means for receiving a modulated space radiated carrier signal and for developing from the modulation components thereof reference signals having frequencies respectively equal to said beat frequency signals, first phase comparison* means energized by one of said beat frequency signals and the corresponding one of said reference signals, second phase comparison means energized by the other beat frequency signal and reference signal, and differential means responsive to the outputs of said phase comparison means for providing position indications.

24. A fine and coarse position determining system, comprising first and second continuous wave systems of the type transmitting non-synchronized wave signals from separate transmitters and providing beat frequency signals used in developing reference signals for transmission, receiving means responsive to the wave signals and reference signals of one of said systems to provide a position indication related to the frequency of the wave signals of said one system, and means to resolve the cyclic ambiguity of said position indications comprising means to provide a position indication in terms of the difference frequency between said first and second systems.

25. A system for providing fine and coarse position indications, comprising first and second continuous wave transmission systems each including spaced non-synchronized transmitters for transmitting continuous wave signals from separate points to produce beat frequency signals and including means for radiating reference signals derived from said beat frequency signals, receiving means responsive to the wave signals and reference signals of one of said systems to provide one of said position indications related to the frequency of the wave signals of said one system, and means responsive to the wave signals and reference signals of both of said systems to provide the other of said position indications related to the relative values of the frequencies of said first and second systems.

26. A system for providing position indications, comprising first and second continuous wave transmission systems each including spaced non-synchronized transmitters for transmitting continuous wave signals from separate points to produce beat frequency signals and including means for radiating reference signals derived from said beat frequency signals, and receiving means responsive to the wave signals and reference signals of both of said systems for providing position indications related to the relative values of the frequencies of said first and second systems.

27. A system for providing position indications, comprising first and second continuous wave transmission systems each including spaced non-synchronized transmitters for transmitting continuous wave signals in pairs from at least two separated points, the signal frequencies utilized in said first system being different from the signal frequencies utilized in said second system, and receiving means responsive to the wave signals of both of said systems for providing position indications related to the relative values of the signal frequencies utilized in said first and second systems.

28. A fine and coarse position determining system, comprising first and second continuous wave systems of the type transmitting non-synchronized wave signals from separate transmitters and providing beat frequency signals for use in developing reference signals for transmission, receiving means responsive to the wave signals and reference signals of one of said systems for providing a position indication related to the frequency of the wave signals of said one system, and means to resolve the cyclic ambiguity of said position indications including means responsive to the wave signals of both of said systems for providing a second position indication related to the frequency difference between the wave signals of said first and second systems.

29. In a position determining system, a pair of continuous wave systems of the type transmitting non-synchronized wave signals from separate transmitters and providing beat frequency signals for use in developing reference signals for transmission, said systems operating at different frequencies, receiver means for each of said systems for receiving said different frequency signals, and means responsive to the outputs of said receiver means for providing a position indication related to the frequency difference between the wave signals of said pair of systems.

30. Wave signal receiving apparatus comprising means to receive a plurality of pairs of signals radiated from two separate locations, said pairs of signals being of distinguishably different frequencies, and the two signals forming each pair being radiated from different locations and each pair of signals haivng the same frequency separation, said receiving apparatus including means for heterodyning the signals of a first of said pairs to produce a first beat frequency and for heterodyning the signals of a second of said pairs to produce a second beat frequency signal equal in frequency to the first beat frequency signal, and means jointly responsive to said beat frequency signals to provide a position indication related to the frequency difference between said pairs.

31. In a system for determining the location of a receiving point respective to spaced transmitters by comparing at said receiving point the phases of signals emitted by said transmitters and received at said receiving point, at least two spaced transmitters for emitting continuously at least three different non-synchronized high frequency waves, the choice of said frequencies being limited by the only condition which is sufficient and necessary that the algebraic sum of the respective products of said frequencies by any integers, at least one of which is positive and at least one of which is negative, is zero, at said receiving point: a receiver comprising in combination filtering, amplifying and mixing means to receive said waves and deduce therefrom by means of differing frequency mixtures two currents having the same frequency and phasemetering means jointly responsive to said two currents for providing an indication concerning the location of said receiving point respective to said transmitters.

32. In a system for determining the location of a receiving point respective to spaced transmitters by comparing at said receiving point the phases of signals emitted by said transmitters and received at said receiving point, at least two spaced transmitters for emitting at least three different high frequency waves, the choice of said frequencies being limited by the only condition which are sufficient and necessary that the algebraic sum of the respective products of said frequencies by any integers, at least one of which is positive and at least one of which is negative, is at least substantially zero, means for cancelling said algebraic sum and for automatically maintaining it at zero, said means comprising in combination: a receiver comprising in combination filtering, amplifying and mixing means, to receive said waves and to deduce therefrom by means of frequency mixtures two currents the difference between the frequencies of which is equal to said algebraic sum and means responsive to the difference between the frequencies and the difference between the phases of said two currents to act upon the frequency and the phase of one of said emitted waves to cancel said frequency difference and consequently to cancel said algebraic sum, at said receiving point: a receiver comprising in combination filtering, amplifying and mixing means to receive said waves and deduce therefrom by means of differing frequency mixtures two currents having the same frequency and phasemetering means jointly responsive to said two currents for providing an indication concerning the location of said receiving point respective to said transmitters.

33. In a system for determining the location of a receiving point respective to spaced transmitters by comparing at said receiving point the phases of signals emitted by said transmitters and received at said receiving point, at least two spaced transmitters to emit continuously four different continuous, non-synchronized high frequency waves subject to the only condition that the difference between two of said frequencies is equal to the difference between two other frequencies, a receiver comprising in combination filtering, amplifying and mixing means to receive said waves and deduce therefrom by means of differing frequency mixtures two currents having the same frequency and phasemetering means jointly responsive to said two currents for providing an indication concerning the location of said receiving point respective to said transmitters.

34. In a system for determining the location of a receiving point respective to spaced transmitters by comparing at said receiving point the phases of signals emitted by said transmitters and received at said receiving point, at least two spaced transmitters to emit four different continuous high frequency waves, the choice of these frequencies being limited by the only condition that the difference between two of said frequencies is at least substantially equal to the difference between two other frequencies, means for rendering equal said two differences and for automatically maintaining them equal, said means comprising in combination: a receiver comprising in combination filtering, amplifying and mixing means to receive said waves and deduce therefrom by differing frequency mixtures two currents the difference between the frequencies of which is equal to the difference of said above mentioned frequency differences, and means responsive to the difference between the frequencies and the difference between the phases of said two currents to control one of said transmitters to regulate the frequency and the phase of the wave emitted thereby to cancel said last mentioned frequency difference and consequently to render equal said two first mentioned frequency differences, a receiver at said receiving point comprising in combination filtering, amplifying and mixing means to receive said waves and derive therefrom by means of differing frequency mixtures two currents having the same frequency and phasemetering means jointly responsive to said two currents for providing an indication concerning the location of said receiving point respective to said transmitters.

35. In a system for determining the location of a receiving point respective to spaced transmitters by comparing at said receiving point the phases of signals emitted by said transmitters and received at said receiving point, at least two spaced transmitters to emit four continuous high frequency waves, respectively having a first, a second, a third and a fourth frequency which are all different and the choice of which is limited by the only condition that the beat between said first and third frequencies on the one hand and between said second and fourth frequencies on the other are equal low frequencies at said receiving point, the first and second frequency waves being radiated from one of said transmitters and the third and fourth frequency waves being radiated from the other transmitter, a receiver comprising in combination filtering, amplifying and mixing means to receive through a first channel said first and third frequencies and to detect the beat thereof and to receive through a second channel said second and fourth frequencies and to detect the beat thereof, and phase metering means jointly responsive to said two beats for providing an indication concerning the position of said receiving point respective to said transmitters.

36. In a system for determining the location of a receiving point respective to spaced transmitters by comparing at said receiving point the phases of signals emitted by said transmitters and received at said receiving point, two spaced transmitters to emit a first, a second, a third and a fourth continuous high frequency wave having respectively a first, a second, a third and a fourth frequency, one of said transmitters emitting said first and second waves and the other said third and fourth waves, said frequencies being all different and their choice being subject to the only condition that the difference between said first and third frequencies is equal to the difference of said second and fourth frequencies, at said receiving point: a receiver comprising in combination filtering, amplifying and mixing means to receive said waves and deduce therefrom by means of differing frequency mixtures two currents having the same frequency one of said currents being derived by beating said first and third frequency waves and the other current being derived by beating said second and fourth frequency waves, and phasemetering means jointly responsive to said two currents for providing an indication concerning the location of said receiving point respective to said transmitters.

37. In a system for determining the location of a receiving point relative to spaced transmitters, at least two spaced transmitters emitting continuously at least three different non-synchronized signals having frequencies which are independent of each other except that they satisfy the relation $$K_1F_1+K_2F_2 \ldots +K_nF_n=0$$

where $F_1$, $F_2 \ldots F_n$ are said frequencies and $K_1$, $K_2$, $\ldots$ $K_n$ are integers at least one of which is positive and at least one of which is negative, whereby two currents of the same frequency can be derived from said signals by combination filtering, mixing and amplifying means, a receiver at said receiving point including combination amplifying, filtering and mixing means to receive said signals and derive therefrom two currents of the same frequency, and means jointly responsive to the last-mentioned two currents for providing an indication about the position of said receiving point relative to said transmitters.

38. In a system for determining the location of a receiving point relative to spaced transmitters by comparing at said receiving point the phases of signals emitted by said transmitters and received at said receiving point, at least two spaced transmitters for emitting at least three different high frequency signals having frequencies which satisfy the relation $$K_1F_1+K_2F_2 \ldots +K_nF_n=0$$

where $F_1$, $F_2 \ldots F_n$ are said frequencies and $K_1$, $K_2$, $\ldots$ $K_n$ are integers at least one of which is positive and at least one of which is negative, whereby two currents of equal frequency can be derived from said signals by combination filtering, amplifying and mixing means, a receiver of fixed location having filtering, amplifying and mixing means to receive said signals and derive therefrom two currents having the same frequency when said relation is satisfied, one of said transmitters having a frequency and phase regulating device, means responsive to the difference between the frequencies and the difference between the phases of said two currents derived by said receiver when said relation is not satisfied to actuate said frequency and phase regulating device to cause the frequencies of said signals to again satisfy said relation, a receiver at said receiving point having filtering, amplifying and mixing means to receive said signals and derive therefrom two currents having the same frequency, and phase metering means jointly responsive to the last-mentioned two currents for providing an indication concerning the location of said receiving point relative to said transmitters.

39. In a system for determining the position of a receiving point, at least two spaced transmitters emitting signals of at least three frequencies, means to regulate one of said frequencies so that said frequencies at least substantially satisfy the relation $$K_1F_1+K_2F_2 \ldots +K_nF_n=0$$

where $F_1$, $F_2 \ldots F_n$ are the frequencies and $K_1$, $K_2$ $\ldots$ $K_n$ are integers at least one of which is positive and at least one of which is negative, whereby two currents can be derived from said signals by combination filtering, amplifying and mixing means which currents have the same frequency when said relation is satisfied and have a

*frequency difference when said relation is not satisfied, said means including a frequency varying device in one of said transmitters, means responsive to all of said signals and having combination amplifying, filtering and mixing means for deriving two currents from said signals and means responsive to any differences in frequency and phase between the last-mentioned two currents when said relation is not satisfied for actuating said frequency varying device to vary said one frequency to compensate for any lack of stability of the other frequencies and cause said relation to be again satisfied, a receiver at said receiving point having combined amplifying, filtering and mixing means for deriving two currents of the same frequency from said signals when said relation is satisfied, and means jointly responsive to the last-mentioned two currents to provide an indication with respect to the position of said receiving point.*

*40. A fine and coarse position determining system, comprising transmitting apparatus for emitting first and second pairs of wave signals from separate transmitters and also including means for beating the waves of at least one of the pairs together to develop beat signals used in deriving reference signals for transmission, the signals of the first pair being distinguishable from the signals of the second pair, receiving means responsive to the wave signals and reference signals to provide a first position indication, and means to resolve the cyclic ambiguity of said first position indication comprising means to provide a second position indication in terms of the difference frequency between the wave signals of the first pair and the wave signals of the second pair.*

*41. Wave signal receiving apparatus comprising means to receive a plurality of pairs of signals radiated from at least two separate locations with at least one signal having modulated thereon reference signals derived from beating the signals of a first of said pairs of signals, said pairs of signals being of distinguishably different frequencies with the two signals forming each pair being radiated from different locations and with each pair of signals having the same frequency separation, said receiving apparatus including means for reproducing the reference signals, for heterodyning the signals of the first pair to produce a first beat frequency and for heterodyning the signals of a second of said pairs to produce a second beat frequency signal equal in frequency to the first beat frequency signal, means jointly responsive to the reproduced reference signals and to the first beat frequency signal for producing a first position indication related to the frequencies of the signals of the first pair, and means jointly responsive*

*to said first and second beat frequency signals to provide a position indication related to the frequency difference between said pairs.*

*42. In a position determining system, a pair of continuous wave systems of the type transmitting wave signals from separate transmitters and providing beat frequency signals for use in developing reference signals for transmission, said systems operating at different frequencies, receiver means for each of said systems for receiving said different frequency signals, means responsive to the outputs of the receiver means for providing a first position indication related to the frequencies of the wave signals of one of said systems, and means responsive to the outputs of said receiver means for providing a second position indication related to the frequency difference between the wave signals of said pair of systems.*

*43. A system for providing position indications, comprising first and second continuous wave transmission systems each including spaced non-synchronized transmitters for continuously transmitting wave signals from separate points and receiving means responsive to the wave signals radiated by both of said systems for providing position indications related to the relative values of the frequencies of said first and second systems.*

*44. A system for providing position indications, comprising first and second continuous wave transmission systems each including spaced non-synchronized transmitters for continuously transmitting wave signals from separate points and receiving means responsive to the wave signals radiated by both of said systems for providing position indications in terms of the frequency difference between the wave signals of the first and second systems.*

References Cited in the file of this patent or the original patent

UNITED STATES PATENTS

| | | |
|---|---|---|
| Re. 23,050 | Brunner | Nov. 23, 1948 |
| 2,144,203 | Shanklin | Jan. 17, 1939 |
| 2,148,267 | Honore | Feb. 21, 1939 |
| 2,407,287 | Labin | Sept. 10, 1946 |
| 2,408,773 | Goodall | Oct. 8, 1946 |
| 2,417,807 | Brunner | Mar. 25, 1947 |
| 2,423,305 | Fletcher | July 1, 1947 |
| 2,470,787 | Nosker | May 24, 1949 |
| 2,500,200 | O'Brien | Mar. 14, 1950 |
| 2,513,315 | Hawkins | July 4, 1950 |
| 2,530,902 | O'Brien | Nov. 21, 1950 |
| 2,598,290 | O'Brien | May 27, 1952 |
| 2,652,559 | Hawkins | Sept. 15, 1953 |